(12) United States Patent
Kandukuri Narayan et al.

(10) Patent No.: US 8,064,330 B2
(45) Date of Patent: Nov. 22, 2011

(54) BIT-WIDTH MINIMIZATION SCHEME FOR WIRELESS COMMUNICATION

(75) Inventors: Sunil K. Kandukuri Narayan, San Diego, CA (US); Hemanth Sampath, San Diego, CA (US); Sameer Vermani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 12/391,951

(22) Filed: Feb. 24, 2009

(65) Prior Publication Data

US 2009/0245089 A1 Oct. 1, 2009

Related U.S. Application Data

(60) Provisional application No. 61/039,764, filed on Mar. 26, 2008.

(51) Int. Cl.
 *H04J 1/00* (2006.01)
 *H04B 7/216* (2006.01)
 *H04L 25/03* (2006.01)

(52) U.S. Cl. ............ 370/210; 370/342; 375/297

(58) Field of Classification Search ......... 370/210, 370/342, 208–209, 343, 334–336, 344–345; 375/295, 297
See application file for complete search history.

(56) References Cited

U.S. PATENT DOCUMENTS

| | | | |
|---|---|---|---|
| 6,026,424 A | 2/2000 | Circenis | |
| 6,366,570 B1 * | 4/2002 | Bhagalia | 370/342 |
| 6,781,980 B1 * | 8/2004 | Dajer et al. | 370/342 |
| 7,535,950 B2 | 5/2009 | Chen et al. | |
| 7,672,359 B2 | 3/2010 | Cleary et al. | |

(Continued)

FOREIGN PATENT DOCUMENTS

CN 101141431 3/2008

(Continued)

OTHER PUBLICATIONS

International Search Report and the Written Opinion—PCT/US2009/035768, International Search Authority—European Patent Office—Sep. 24, 2009.

*Primary Examiner* — Andrew Lai
*Assistant Examiner* — Candal Elpenord
(74) *Attorney, Agent, or Firm* — Larry Moskowitz; Abdollah Katbab

(57) ABSTRACT

A technique for generating a reduced bit-width in a signal generated by a first-type modulator in a communication apparatus that includes two distinct modulators. In particular, the communication apparatus includes a first modulator adapted to generate a first modulated signal quantified to a first bit-width, a second modulator adapted to generate a second modulated signal quantified to a second bit-width that is less than the first bit-width, and a device to generate a third modulated signal comprising a combination of the first and second modulated signals. In an exemplary implementation, the first modulator includes an OFDMA modulator, the second modulator includes a CDMA, and the combining device includes an IFFT. Additionally, an apparatus for processing a communication signal includes a tasklist cache memory having a tasklist, a processor adapted to provide a task to the tasklist, and a communication module adapted to fetch the task from the tasklist, and process the communication signal based on the retrieved task.

13 Claims, 6 Drawing Sheets

U.S. PATENT DOCUMENTS

| | | | |
|---|---|---|---|
| 2004/0114671 A1* | 6/2004 | Inogai | 375/146 |
| 2004/0208232 A1* | 10/2004 | Sudo | 375/146 |
| 2005/0063345 A1* | 3/2005 | Wu et al. | 370/335 |
| 2007/0195734 A1* | 8/2007 | Das et al. | 370/335 |
| 2007/0223406 A1* | 9/2007 | Li et al. | 370/278 |
| 2007/0230598 A1* | 10/2007 | Wang | 375/260 |
| 2008/0013476 A1* | 1/2008 | Vasudevan | 370/328 |

FOREIGN PATENT DOCUMENTS

| | | |
|---|---|---|
| EP | 1447915 A1 | 8/2004 |
| JP | 2002152198 | 5/2002 |
| KR | 20030044466 | 6/2003 |

* cited by examiner

BIT-WIDTH MINIMIZATION SCHEME FOR WIRELESS COMMUNICATION

CROSS-REFERENCE TO A RELATED APPLICATION

This application claims the benefit of the filing date of Provisional Patent Application, Ser. No. 61/039,764, filed on Mar. 26, 2008, and entitled "Bit-Width Minimization Scheme for Wireless Communication," which is incorporated herein by reference.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
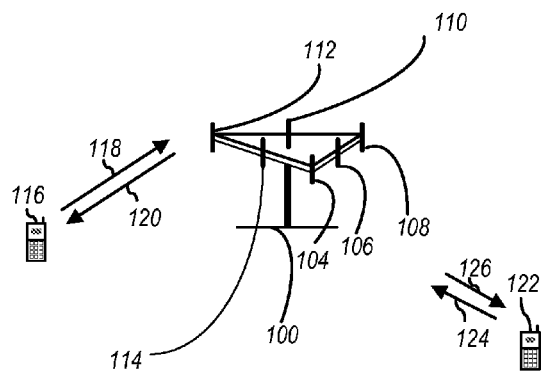
FIG. 1 is an illustration of a multiple access wireless communication system according to one embodiment.

Referring to FIG. 1, a multiple access wireless communication system according to one embodiment is illustrated. A access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, or some other terminology.

Figure 2:
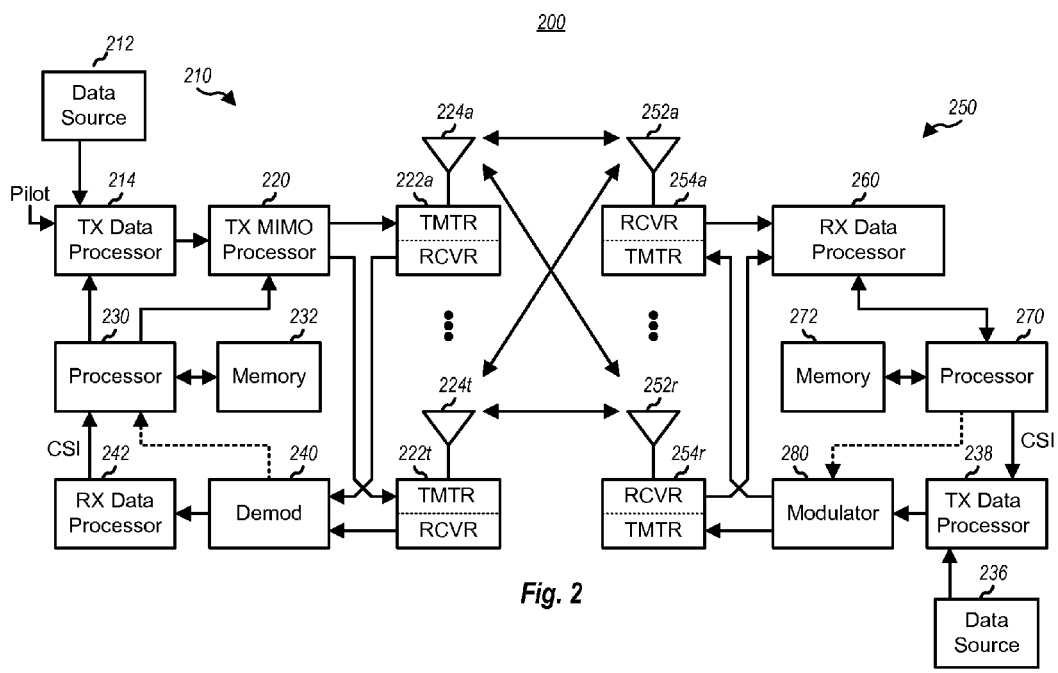
FIG. 2 is a block diagram illustration of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beam forming weights then processes the extracted message.

In modern communication systems, under the UMB standard as one of several possible examples, there has been the requirement of transmitting a CDMA segment with the OFDMA transmission. The composite waveform from both the CDMA and the OFDMA segments generally go through an IFFT transformation before getting up-sampled and transmitted over the air. This composite waveform at the IFFT input generally has a large dynamic range and hence requires a certain bit-width for signal representation. The understanding of related approaches is that a fixed allocation of a 16 bit width per CDMA and per OFDMA is to be used.

However, in evaluation of the CDMA portion of the composite waveform, it has been found that the dynamic range of the CDMA portion is smaller than the dynamic range of the OFDMA segment. Also, it has been found that the relative strengths of the CDMA and OFDMA waveforms are known at the transmitter. Taking these two observations into consideration, an overall composite waveform with a reduced bit-width CDMA segment can be generated.

Specifically, based on studies performed, the overall dynamic range for the composite waveform has been evaluated to be approximately 63 dB. This translates to approximately 12 bits (11 bits for range and 1 bit for sign) at the IFFT input. Given a possible Gaussian probability distribution function for the time-domain waveform, additional bits are added, resulting in an overall bit length of approximately 14 bits.

It is apparent, therefore, that 14 bits are less than the 16 bits/CDMA+16 bits/ODFMA described above. Because of the reduced bit width it is possible to use less bits in hardware (e.g., cheaper hardware and/or faster hardware), resulting in improved cost and/or performance efficiencies. It should be noted, however, that though 14 bits has been found to be appropriate for the studies performed, more or less bits may be used, depending on the type of study performed, as well as design and performance objectives. For example, though a reduced bit computation was based on the overall dynamic range of the composite waveform, it is possible to modify the disclosed process to arrive at a reduced bit width by allocating reduced bits only to the CDMA portion of the composite signal. It is noted that the bit-width for the CDMA portion of the signal is usually less than the bit-width for the OFDMA portion of the signal. Also, conceivably any loss in resolution or quantization caused by the use of reduced bits may be isolated to the CDMA portion of the signal or vice versa, to the OFDMA portion of the signal, as according to design preference. Thereby, by determining the sensitivity of the signal waveform to degradation of the CDMA or OFDMA due to the reduced bit allocation, adjustments may be made to the bit width or to the portion of the signal that it is applied to.

Figure 3:
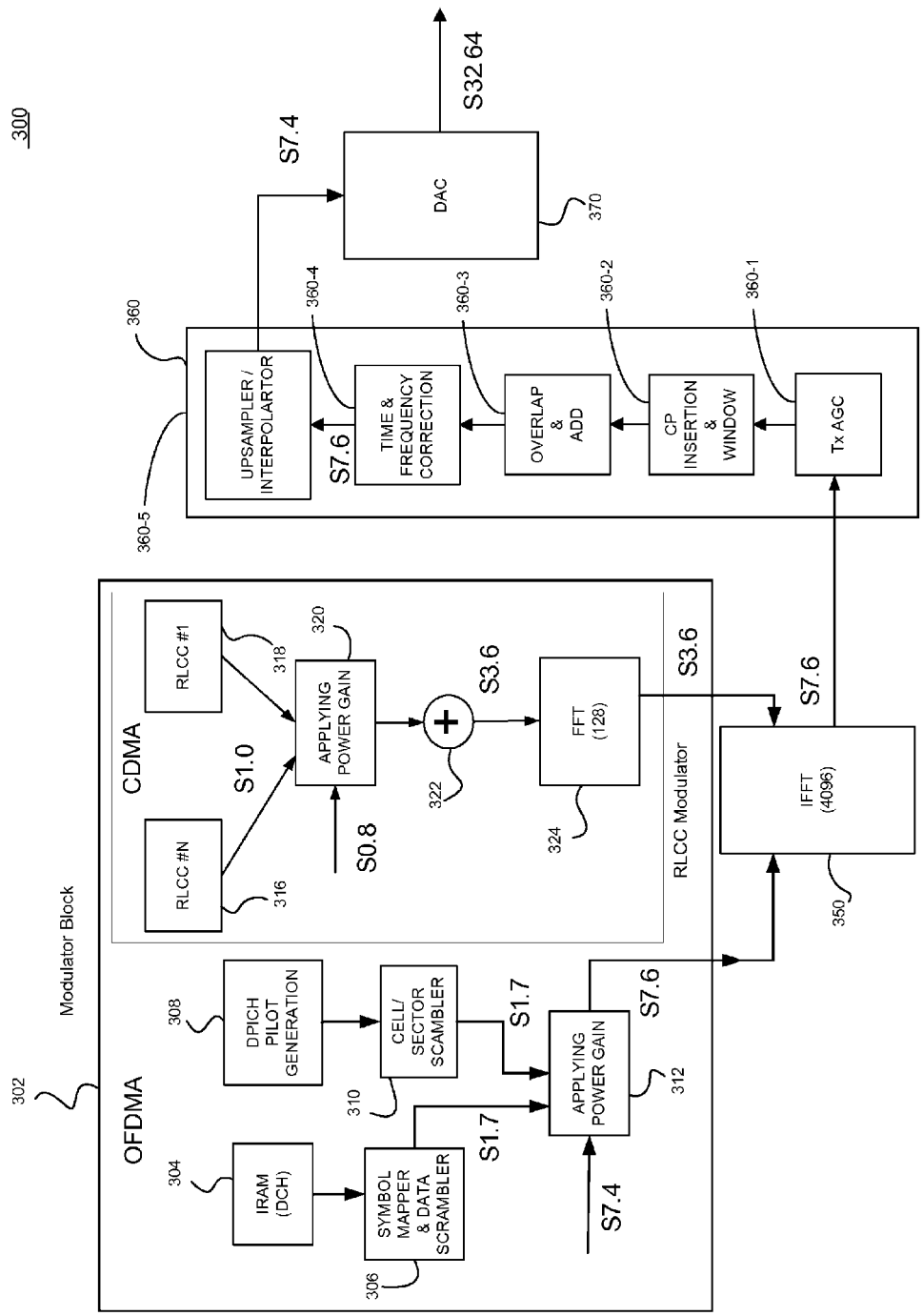
FIG. 3 is a block diagram of a transmit data path and respective bit widths according to one embodiment.

FIG. 3 is a block diagram 300 of a transmit data path and the respective bit widths for an exemplary reduced bit scheme. The transmit data path is shown with a modulator block 302, an IFFT block 350, and associated blocks 360, with a DAC block 370. The modulator block 302 contains OFDMA related blocks and CDMA related blocks.

The OFDMA related blocks are the interleaver random access memory (IRAM) data channel (DCH) 304, a Symbol Mapper & Data Scrambler 306, a dedicated pilot channel (DPICH) Pilot Generator 308, a Cell/Sector Scrambler 310, and an Applying Power Gain block 312. The IRAM (DCH) 304 codes and interleaves traffic data. The Symbol Mapper & Data Scrambler 306 generates symbols from the coded and interleaved bits received from the IRAM (DCH) 306, and performs a predetermined scrambling of the symbols. The DPICH pilot generation 308 generates symbols for the pilot channel. The Cell/Sector scrambler 310 performs a predetermined scrambling of the pilot symbols. And, the Applying Power Gain combines and amplifies the symbols from the Symbol Mapper & Data Scrambler 306 and Cell/Sector Scrambler 310. It shall be understood that the OFDMA portion may be configured differently.

As can be seen from the outputs of the Symbol Mapper & Data Scrambler 306 and the Cell/Sector Scrambler 310, the bit width is designated S1.7, where "S" represents a signed value, the "1" represents the number for integer values, and "7" represents the number for decimal values. The Applying Power Gain 312 applies a gain factor having a bit width of S7.4 to the outputs of the Symbol Mapper & Data Scrambler 306 and the Cell/Sector Scrambler 310. Therefore, S7.4 represents 12 bits (1 for sign, 7 for integer, and 4 for decimal). The output of the Applying Power Gain block 312 is shown having 14 bits (S7.6). As stated above, it is noted that the bit-width for the CDMA portion of the signal is usually less than the bit-width for the OFDMA portion of the signal.

The CDMA related blocks contain a plurality of reverse link control channels RLCC #N 316 to RLCC #1 318 blocks having 2 bits (S1.0) coupled to the Applying Power Gain block 320. The applied power signals are added by the Adder 322 and then a Fast Fourier Transfer (FFT) is performed by the FFT block 324. It shall be understood that the CDMA portion may be configured differently.

The bit width after the FFT block 324 is designated as 10 (S3.6). The outputs of the CDMA related blocks and the OFDMA related blocks are inputs to the IFFT block 350 to generate a value represented by 14 bits (S7.6). It is noted that the IFFT block 350 is illustrated as having 4096 points. Of course, less or more points may be used, if desired. From the IFFT block 350, the signal proceeds through various other devices/processes where it is upsampled/interporlated resulting in a bit width of 12 (S7.4) The resulting bit-width represented signal is then converted into an analog signal via the 12-bit DAC 370 for further operation or transmission.

More specifically, the associated blocks 360 includes a transmitter (Tx) automatic gain control (AGC) 360-1 to boost the power of the output of the IFFT 350 to a predetermined level. The associated blocks 360 also includes a cyclic prefix (CP) insertion and window 360-2 to add a cyclic prefix and windowing to the output of the TX AGC 360-1 to reduce intersymbol interference and smooth the output waveform. The associated blocks 360 further includes an overlap & add 360-3 to further smooth the output waveform. The associated blocks 360 further includes a time and frequency correction 360-4 to perform correction of the time and frequency of the output waveform. The associated blocks 360 further includes an upsampler/interpolator to upconvert the signal to a higher frequency (e.g., from 40 MHz to 160 MHz). It shall be understood that the associated blocks 360 may be configured differently. The output of the associated blocks 360 is coupled to a digital-to-analog converter (DAC), which converts the output signal into an analog signal for transmission.

It should be understood that while the above example provided definitive bit width assignment values during the various stages of the data path, these assignment values may be adjusted according to the design chosen, the hardware used, the performance objectives desired, etc. Therefore, the values determined in FIG. 3, though applicable to the system shown, may accordingly be changed.

Although in the above example, the system 300 has been described with reference to setting the respective bit-widths of CDMA and OFDMA signals and combining the signals, it shall be understood that the system 300 is applicable to setting the bit-widths of two or more distinct modulation signals, and combining the two or more distinct modulations signals.

Figure 4:
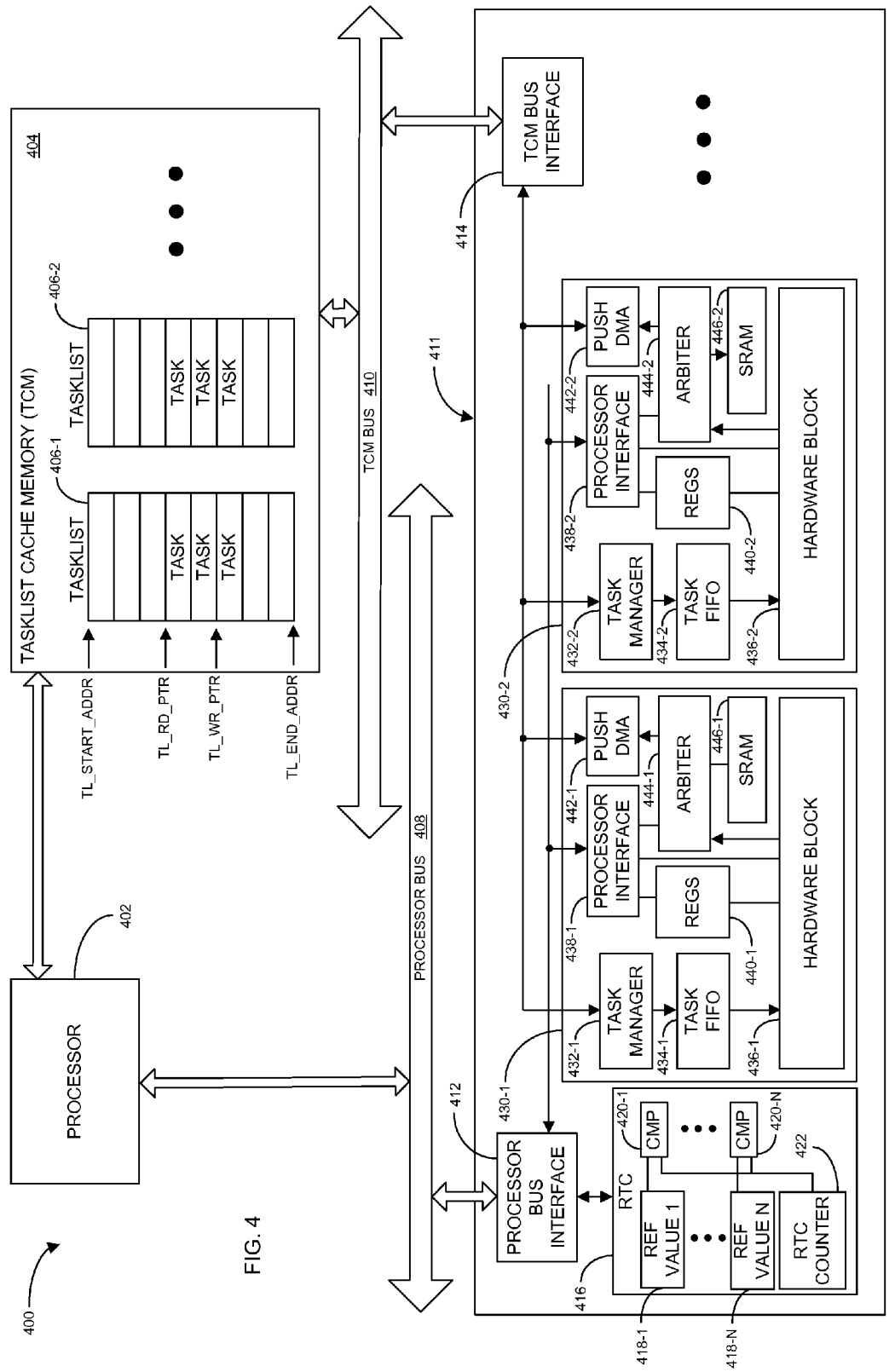
FIG. 4 is a block diagram of another exemplary communication system in accordance with another embodiment of the invention.

FIG. 4 is a block diagram of another exemplary communication system 400 in accordance with another embodiment of the invention. In summary, the communication system 400 implements a unique technique for providing tasks to communication hardware (HW) for execution thereof. In particular, a processor writes tasks for the communication hardware (HW) to a tasklist cache memory (TCM). The communication hardware (HW), in turn, fetches the tasks from the tasklist cache memory (TCM), and then executes the tasks based on one or more timing parameters. Thus, instead of the processor having direct access to the communication hardware (HW), the processor instructs the communication hardwave (HW) via the cache memory. This improves processor performance and efficiency.

More specifically, the communication system 400 comprises a processor 402, a tasklist cache memory (TCM) 404 including one or more tasklists 406-1, 406-2, etc., a processor bus 408, a TCM bus 410, and communication hardware (HW) 411. The communication hardware (HW) 411, in turn, comprises a processor bus interface 412, a TCM bus interface 414, a real time clock (RTC) 416, and one or more communication modules 430-1, 430-2, etc. The RTC 416, in turn, comprises an RTC counter 422, one or more reference value storing units 418-1 to 418-N, and one or more comparators (CMP) 420-1 to 420-N.

Each communication module (430-1, 430-2) comprises a task manager (431-1, 432-2), a task FIFO (434-1, 434-2), a hardware block (436-1, 436-2), a processor interface (438-1, 438-2), one or more registers (440-1, 440-2), a push direct memory access (DMA) (442-1, 442-2), a memory arbiter (444-1, 444-2), and a static random access memory (446-1, 446-2). The hardware block (436-1, 436-2) may be any device of a communication system, such as those described with reference to FIGS. 2-3.

A summary of the operation is now provided. The processor 402 writes tasks for the communication modules 430-1 and 430-2 in respective tasklists 406-1 and 406-2 of the tasklist cache memory (TCM) 404. If any of these tasks requires execution by a certain time, the processor 402 also writes the timing information to one or more of the reference value storing units 418-1 to 418-N of the RTC 416 via the processor bus 408 and the processor bus interface 412. The communication modules 430-1 and 430-2 fetches the tasks from the respective tasklists 406-1 and 406-2 of the tasklist cache memory (TCM) 404 via the TCM bus 410 and TCM bus interface 414.

In particular, the task manager (432-1, 432-2) of each communication module (430-1, 430-2) performs the fetching of the tasks. Once the task manager (432-1, 432-2) fetches the tasks, it provides it sequentially to the task FIFO (434-1, 434-2). The hardware block (436-1, 436-2), in turn, fetches the tasks from the TASK FIFO (434-1, 434-2), populates the registers (440-1, 440-2) according to the tasks, and executes the tasks. If the processor 402 needs to be notified of the completion of a task, the hardware block (436-1, 436-2) sends an interrupt to the processor 402 via the processor interface (438-1, 438-2), the processor bus interface 412, and the processor bus 408. If the hardware block (436-1, 436-2) generates data, the data may be sent to the SRAM (446-1, 446-2) for storage via the memory arbiter (444-1, 444-2). If the processor 402 needs to obtain access to the data, the data may be pushed to the tasklist cache memory (TCM) 404 by the push DMA (442-1, 442-2) via the TCM bus interface 414 and TCM bus 410. If necessary, the processor 402 may also obtain access to the register (440-1, 440-2) and/or communicate directly with the hardware block (436-1, 436-2) via the processor bus 408, processor bus interface 412, and processor interface (438-1, 438-2). The following describes particular methods implemented in the communication system 400.

Figure 5:
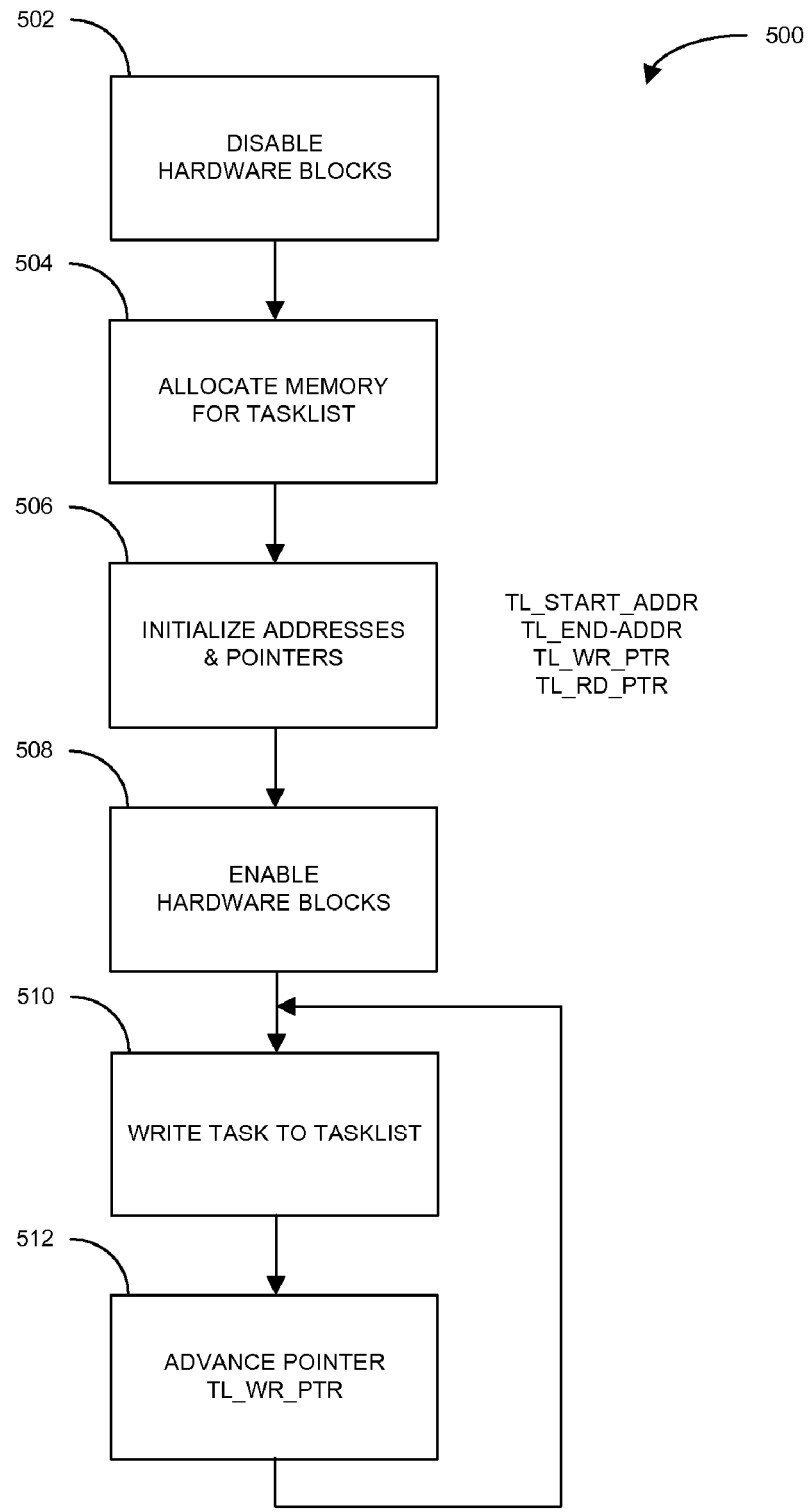
FIG. 5 is a flow diagram of an exemplary method of providing tasks for communication hardware (HW) in accordance with another embodiment of the invention.

FIG. 5 is a flow diagram of an exemplary method 500 of providing tasks for communication hardware (HW) in accordance with another embodiment of the invention. According to the method 500, the processor 402 starts by performing an initialization procedure by disabling the hardware blocks (436-1, 436-2, etc.) (block 502). The processor 402 continues the initialization procedure by allocating memory for the one or more tasklists 406-1, 406-2, etc., in the tasklist cache memory (TCM) 404 (block 504).

Then, according to the initialization procedure, the processor 402 initializes the respective start and end addresses TL_START_ADDR and TL_END_ADDR and the respective write and read pointers TL_WR_PTR and TL_RD_PTR of the tasklists 406-1, 406-2 (block 506). As an example, the processor 402 initializes the start address TL_START_ADDR at the top or beginning of the corresponding tasklist. The processor 402 initializes the end address TL_END_ADDR at the bottom or end of the corresponding tasklist. The processor 402 also initializes the write and read pointers TL_WR_PTR and TL_RD_PTR at the top or beginning of the corresponding tasklist. The processor 402 then completes the initialization procedure by enabling the hardware blocks (block 508). The processor 402 then writes a task into the corresponding address of the tasklist indicated by the write pointer TL_WR_PTR (block 510). The processor 402 then advances the write pointer TL_WR_PTR to the next address of the tasklist (block 512). The processor 402 then repeats the operations of blocks 510 and 512 to add additional tasks for the corresponding communication module.

Figure 6:
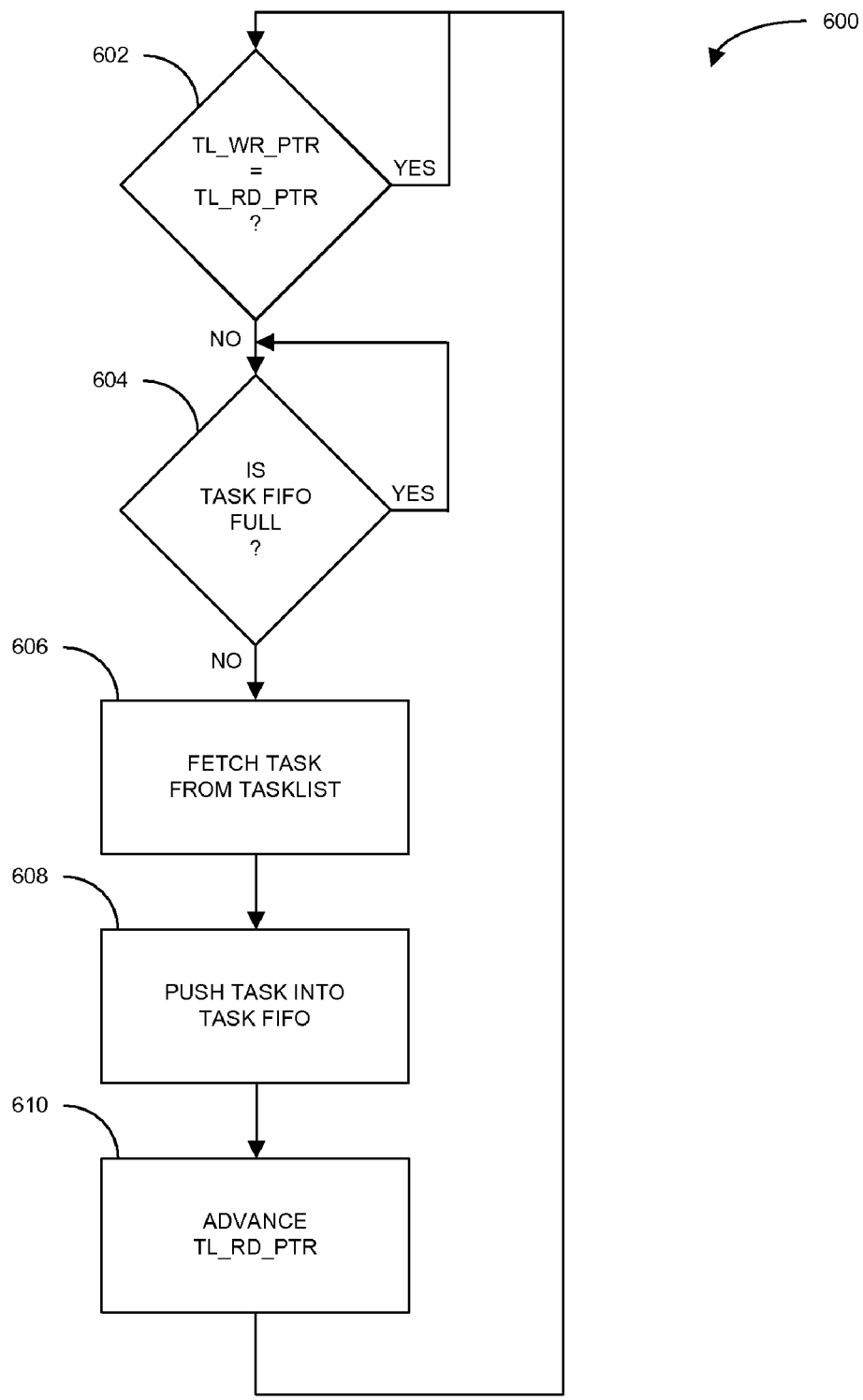
FIG. 6 is a flow diagram of an exemplary method of retrieving tasks for communication hardware (HW)) in accordance with another embodiment of the invention.

FIG. 6 is a flow diagram of an exemplary method 600 of obtaining tasks for communication hardware (HW) in accordance with another embodiment of the invention. According to the method 600, the task manager (432-1, 432-2) of the corresponding communication module (430-1, 430-2) determines whether the write pointer TL_WR_PTR points to the same address of the task list (406-1, 406-2) to which the read pointer TL_RD_PTR points (block 602). If the task manager (432-1, 432-2) determines that the read and write pointers are pointing to the same address, the task manager continues to make the same determination in block 602. If the task manager (432-1, 432-2) determines that the read and write pointers are not pointing to the same address, the task manager then determines whether the corresponding task FIFO (434-1, 434-2) is full (block 604). If the task manager (432-1, 432-2) determines that the task FIFO is full, the task manager continues to make the same determination in block 604.

If the task manager (432-1, 432-2) determines that the task FIFO is not full, the task manager fetches a task from the corresponding tasklist (406-1, 406-2) (block 606). The task manager (432-1, 432-2) then pushes the task into the corresponding task FIFO (434-1, 434-2) (block 608). The task manager (432-1, 432-2) then advances the corresponding read pointer TL_RD_PTR to the next address of the corresponding tasklist (406-1, 406-2). The task manager (432-1, 432-2) then returns back to operation specified in block 602, and repeats the process for the next task.

Figure 7:
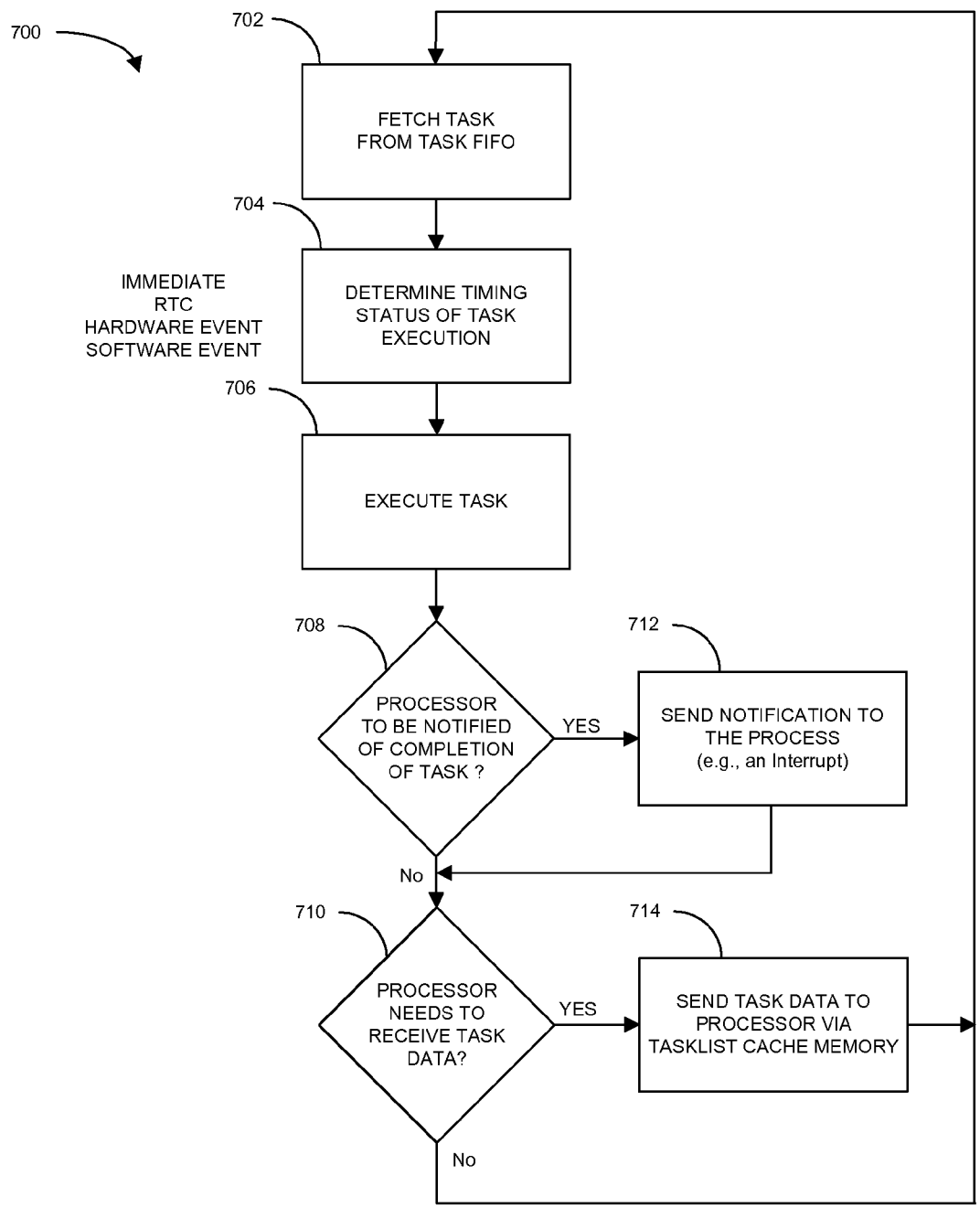
FIG. 7 is a flow diagram of an exemplary method of executing tasks by hardware block in accordance with another embodiment of the invention.

FIG. 7 is a flow diagram of an exemplary method 700 of executing tasks by hardware block in accordance with another embodiment of the invention. According to the method 700, the hardware block (436-1, 436-2) fetches a task from the corresponding task FIFO (434-1, 434-2) (block 702). The hardware block (436-1, 436-2) then determines the timing status of the task execution (block 704). For example, the retrieved task could be executed immediately, or based on the RTC 416, or based on an event that occurred in the corresponding hardware block (436-1, 436-2), or based on a software event running on the processor 402. The hardware block (436-1, 436-2) then executes the task according to the timing status (block 706).

After completing the task, the hardware block (436-1, 436-2) determines whether the processor 402 is to be notified of the completion of the task (block 708). If the hardware block (436-1, 436-2) determines that the processor 402 is to be notified, the hardware block sends a notification (e.g., an interrupt) to the processor 402 via the corresponding processor interface (438-1, 438-2), processor bus interface 412, and processor bus 408 (block 712). The hardware block (436-1, 436-2) then determines whether the processor 402 needs to receive the data generated by executing the task (block 710). If the hardware block (436-1, 436-2) determines that the processor 402 needs the task data, the hardware block sends the data to the processor 402 via the corresponding push DMA (442-1, 442-2, the TCM bus interface 414, TCM bus 410, and the tasklist cache memory (TCM) 404 (block 714), and then continues to block 702 to fetch another task from the task FIFO. If the hardware block (436-1, 436-2) determines that the processor 402 does not need the task data, the hardware block continues to block 702 to fetch another task from the task FIFO.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, changes in energy states, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus operable in a wireless communication system for reduced bit-width Code Division Multiple Access (CDMA) Fast Fourier Transform (FFT) in an Orthogonal Frequency Division Multiple Access (OFDMA) transmitter of an access terminal, the apparatus comprising:
    means for applying a first power signal to at least one of a plurality of CDMA input signals to generate a reduced bit-width CDMA signal;
    means for summing the plurality of CDMA input signals with the applied power signal;
    means for performing an FFT on the plurality of CDMA signals;
    means for applying a second power signal to an OFDMA signal; and
    means for combining the fast Fourier transformed CDMA signals with the OFDMA signal,
    wherein the first power signal applied to the CDMA input signal has a reduced bit-width relative to the second power signal applied to the OFDMA signal.

2. A method for reduced bit-width Code Division Multiple Access (CDMA) Fast Fourier Transform (FFT) in an Orthogonal Frequency Division Multiple Access (OFDMA) transmitter of an access terminal, comprising:
    applying a first power signal to at least one of a plurality of CDMA input signals to generate a reduced bit-width CDMA signal;
    summing the plurality of CDMA input signals with the applied power signal;
    performing an FFT on the plurality of CDMA signals;
    applying a second power signal to an OFDMA signal; and
    combining the fast Fourier transformed CDMA signals with the OFDMA signal, wherein the first power signal applied to the CDMA input signal has a reduced bit-width relative to the second power signal applied to the OFDMA signal.

3. An apparatus operable in wireless communication system for reduced bit-width Code Division Multiple Access (CDMA) Fast Fourier Transform (FFT) in an Orthogonal Frequency Division Multiple Access (OFDMA) transmitter of an access terminal, the apparatus comprising:
    a first amplifier for applying a first power signal to at least one of a plurality of CDMA input signals to generate a reduced bit-width CDMA signal;
    a summer for summing the plurality of CDMA input signals with the applied power signal;
    an FFT engine for performing an FFT on the plurality of CDMA signals;
    a second amplifier for applying a second power signal to an OFDMA signal; and
    a combiner for combining the fast Fourier transformed CDMA signals with the OFDMA signal,
    wherein the first power signal applied to the CDMA input signal has a reduced bit-width relative to the second power signal applied to the OFDMA signal.

4. The method of claim 2, wherein the reduced bit-width CDMA signal comprises fourteen bits, wherein one of the fourteen bits includes a sign bit, wherein seven of the fourteen bits include bits reserved for an integer, and wherein six of the fourteen bits includes bits reserved for a fraction.

5. The method of claim 2, wherein the second power signal applied to the OFDMA signal comprises ten bits, wherein one of the ten bits includes a sign bit, wherein three of the ten bits includes bits reserved for an integer, and wherein six of the ten bits includes bits reserved for a fraction.

6. The method of claim 2, wherein combining the fast Fourier transformed CDMA signals with the OFDMA signal further comprises performing an inverse Fast Fourier Transform (IFFT).

7. The method of claim 2, wherein applying the first power signal, summing the plurality of CDMA input signals, performing the FFT, applying the second power signal, and combining the fast Fourier transformed CDMA signals with the OFDMA signal further comprise processing a communication signal by a communication module, the method further comprising:
    writing a task into a tasklist stored in a tasklist cache memory (TCM) by a processor;
    fetching the task from the tasklist by the communication module; and
    processing the communication signal by the communication module.

8. The apparatus of claim 3, wherein the first amplifier and the summer comprise an OFDMA modulator that further comprises:
    an interleaver random access memory (IRAM) for providing interleaved data;
    a symbol mapper and data scrambler for generating scrambled data symbols from the interleaved data;
    a dedicated pilot channel pilot generator for generating pilot symbols;
    a pilot scrambler for scrambling the pilot symbols; and
    a power gain module for generating the reduced bit-width CDMA signal from the scrambled data symbols, the pilot symbols, and a bit-width parameter adapted to configure the first modulated signal to have the first bit-width.

9. The apparatus of claim 3, wherein the second amplifier comprises a CDMA modulator that further comprises:
    a plurality of reverse link control channels adapted to generate respective CDMA modulated data; and
    an adder for combining the respective CDMA modulated data,
    wherein FFT engine generates the second modulated signal from the combined CDMA modulated data.

10. The apparatus of claim 3, wherein the combiner comprises an inverse Fast Fourier Transform (IFFT).

11. The apparatus of claim 3, wherein the apparatus processes a communication signal and further comprises:
    a tasklist cache memory (TCM) including a tasklist;
    a processor for providing a task to the tasklist; and
    a communication module comprising the first amplifier, the summer, the FFT engine, and the second amplifier for fetching the task from the tasklist, and for processing the communication signal based on the task.

12. The apparatus of claim 11 wherein the communication module further comprises: a task manager adapted to fetch the task from the tasklist; a task First In First Out (FIFO) adapted to store the task retrieved by the task manager; a hardware block adapted to process the communication signal based on the retrieved task; a plurality of registers adapted to store parameters for controlling the processing of the communication signal; a random access memory (RAM) adapted to store data generated based on the hardware block processing the communication signal; a first bus coupled between the communication module and the tasklist cache memory (TCM), wherein the communication module comprises a direct memory access (DMA) adapted to transmit the data from the RAM to the tasklist cache memory (TCM) via the first bus; and a second bus coupled between the communication module and the processor, wherein the communication module further includes an interface adapted to communicate data with the processor by way of the second bus.

13. A computer program product, comprising; non-transitory computer-readable medium comprising:
    codes for causing a computer to apply a first power signal to at least one of a plurality of Code Division Multiple Access (CDMA) input signals to generate a reduced bit-width CDMA signal;
    codes for causing the computer to sum the plurality of CDMA input signals with the applied power signal;
    codes for causing the computer to perform a Fast Fourier Transform (FFT) on the plurality of CDMA signals to produce a fast Fourier transformed signal;
    codes for causing the computer to apply a second power signal to an Orthogonal Frequency Division Multiple Access (OFDMA) signal; and
    codes for causing the computer to combine the fast Fourier transformed CDMA signals with the OFDMA signal,
    wherein the first power signal applied to the CDMA input signal has a reduced bit-width relative to the second power signal applied to the OFDMA signal.

* * * * *